(12) United States Patent
Tjio et al.

(10) Patent No.: US 8,381,250 B2
(45) Date of Patent: Feb. 19, 2013

(54) CUSTOMER PREMISES EQUIPMENT ARCHITECTURE FOR BUNDLED SERVICES IN A FIXED BROADBAND WIRELESS INSTALLATION

(75) Inventors: Lee K. Tjio, Danville, CA (US); Lalit Ratilal Kotecha, San Ramon, CA (US); Kamlesh S. Kamdar, Dublin, CA (US); Aref H. Iskandar, Danbury, CT (US); Sergio Aguirre, Southlake, TX (US); Raafat Edward Kamel, Little Falls, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 12/854,518

(22) Filed: Aug. 11, 2010

(65) Prior Publication Data

US 2012/0042345 A1 Feb. 16, 2012

(51) Int. Cl.
*H04N 7/20* (2006.01)
(52) U.S. Cl. ............. 725/63; 725/62; 725/78; 725/110; 725/127
(58) Field of Classification Search .................... 725/62, 725/63, 78, 110, 127
See application file for complete search history.

(56) References Cited

U.S. PATENT DOCUMENTS

| | | | |
|---|---|---|---|
| 6,731,946 B1 * | 5/2004 | Stanwood et al. | 455/517 |
| 2002/0001337 A1 * | 1/2002 | Chauncey et al. | 375/132 |
| 2005/0179607 A1 | 8/2005 | Gorsuch et al. | |
| 2007/0086376 A1 * | 4/2007 | Prager et al. | 370/328 |
| 2007/0147290 A1 | 6/2007 | Dispensa et al. | |
| 2007/0173303 A1 | 7/2007 | Viorel et al. | |
| 2008/0151857 A1 | 6/2008 | Dolgonos | |
| 2008/0276268 A1 | 11/2008 | Harpak et al. | |
| 2009/0268675 A1 | 10/2009 | Choi | |
| 2010/0311321 A1 | 12/2010 | Norin | |
| 2010/0313232 A1 * | 12/2010 | Norin | 725/110 |
| 2011/0010749 A1 * | 1/2011 | Alkan | 725/127 |

* cited by examiner

*Primary Examiner* — Pankaj Kumar
*Assistant Examiner* — Mulugeta Mengesha (57) ABSTRACT

One or more network devices receive, at a location outside a customer premises, a broadband signal from a base station of a wireless network and a satellite television signal from a satellite antenna. The one or more network devices combine, at the location outside the customer premises, the broadband signal with the satellite television signal in a single coaxial cable and send, via the single coaxial cable, the broadband signal and the satellite television signal to one or more devices inside the customer premises.

18 Claims, 10 Drawing Sheets

CUSTOMER PREMISES EQUIPMENT ARCHITECTURE FOR BUNDLED SERVICES IN A FIXED BROADBAND WIRELESS INSTALLATION

BACKGROUND

Bundled media services (e.g., combination packages of television, telephone, and broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remained unpopular.

As wireless network data rates improve using fourth generation (4G) technologies, such as Long-Term Evolution (LTE), network data rates have become more attractive for fixed wireless networks. However, CPE and installation costs have remained a barrier to successfully promoting bundled services over fixed wireless networks.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a customer premises equipment (CPE) wireless architecture with simplified initial installation and reduced operational costs. Systems and/or methods described herein may allow cellular and satellite TV service providers to offer bundled services (e.g., voice over Internet protocol (VoIP), broadband access, satellite TV, etc.) in geographical areas not currently served by wired connections, such as digital subscribers lines (DSL) or cable.

In one example implementation, the systems and/or methods may receive, at a location outside a customer premises, a broadband signal from a base station of a wireless network and a satellite television signal from a satellite antenna. The systems and/or methods may combine, at the location outside the customer premises, the broadband signal with the satellite television signal in a single coaxial cable and send, via the single coaxial cable, the broadband signal and the satellite television signal to one or more devices inside the customer premises. The systems and/or methods may also receive, over the single coaxial cable, data from the one or more devices inside the customer premises and transmit the data, using a broadband signal, to the base station.

Figure 1:
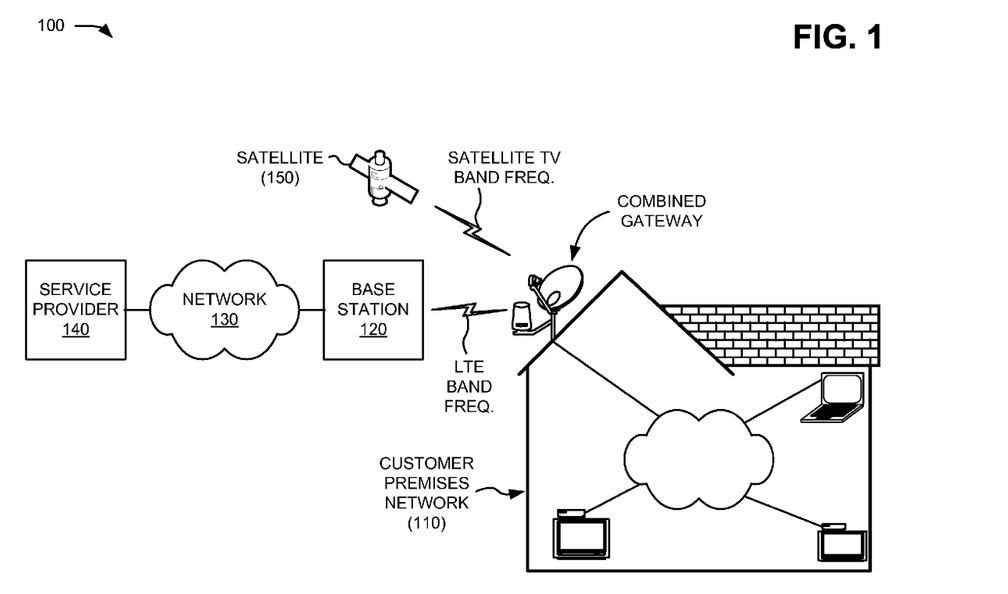
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises network 110, a base station 120, a network 130, a content provider 140, and a satellite 150. A single customer premises network 110, base station 120, network 130, content provider 140, and satellite 150 have been illustrated in FIG. 1 for simplicity. In practice, there may be more customer premises networks 110, base stations 120, networks 130, content providers 140, and/or satellites 150.

Customer premises network 110 may include one or more devices connected to each other, base station 120, and/or satellite 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards). In the example shown in FIG. 1, customer premises network 110 is connected to base station 120 through a two-way wireless connection (e.g., using an LTE band frequency) and connected to satellite 150 through a one-way (e.g., downlink) wireless connection (e.g., using a satellite TV band frequency). As shown, the two-way wireless connection and the one-way wireless connection may be implemented using a combined gateway that is described further herein.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one implementation, base station 120 may utilize LTE standards operating in a 700 MHz frequency band.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Service provider 140 may include one or more server devices, or other types of computation or communication devices, that gather, process, search, and/or provide information in a manner described herein. In one implementation, service provider 140 may include a web server, computer system, an application, a cable head-end, and/or a broadcasting device capable of providing Internet Protocol (IP)-based content and/or services to devices in customer premises network 110.

Satellite 150 may provide multimedia content from, for example, a direct broadcast satellite (DBS) service provider (not shown). Satellite 150 may provide a downlink signal over a designated satellite TV band frequency, typically in the range of 950 MHz to 2150 MHz. The downlink signal may be received using a satellite antenna/receiver system at a customer premises to present satellite TV content to a user.

In implementations described herein, customer premises network 110 may combine LTE functionality with satellite TV service. Using a combined gateway that includes an outdoor LTE modem, both broadband (over LTE) service (e.g., via base station 120) and satellite TV service (e.g., via satellite 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
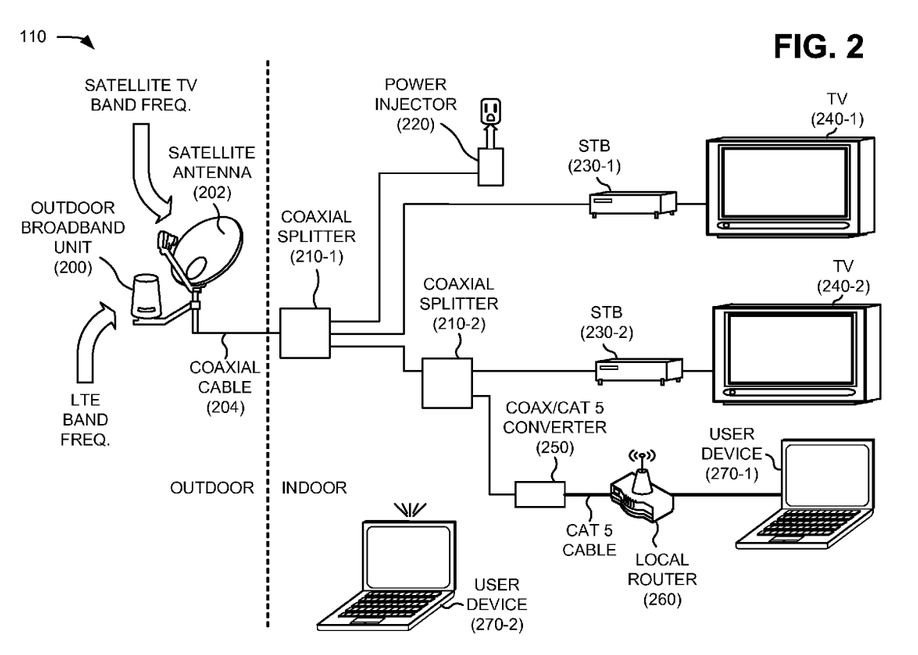
FIG. 2 is a diagram of an example customer premises network illustrated in FIG. 1 according to an implementation described herein.

FIG. 2 is a diagram of an example customer premises network 110 according to an implementation described herein. As illustrated, customer premises network 110 may include an outdoor broadband unit 200, a satellite antenna 202, coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110). For example, outdoor broadband unit 200 may utilize a pre-existing or new satellite TV installation in a way that both broadband (over LTE) service and satellite TV are brought indoors (e.g., inside the customer premises) over a single coaxial cable 204. Outdoor broadband unit 200 is discussed further in connection with, for example, FIG. 3.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with an STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter. For example, coaxial splitters 210 may facilitate allocating logical channels using different frequency blocks for viewer-selected television programming and broadband signals to the SWiM-compatible STBs 230 and/or local router 260.

Power injector 220 may include a conventional mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 adapter 250 may include a conventional device to convert incoming signals from coaxial cables to outgoing signals on Cat 5 cables.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a tablet computer, a gaming system, etc.

In implementation described herein, customer premises equipment for wireless broadband service can be integrated with the satellite TV MoCA and SWiM environment to provide both TV services and broadband wireless service. With this architecture, the combination of outdoor broadband unit 200 and satellite antenna 202 may follow a channelization plan dubbed "Mid-RF" (425-650 MHz), requiring a single coax line (e.g., coaxial cable 204) in the deployment. Coaxial cable 204 may feed the in-home coaxial installation to deliver the satellite TV services to the corresponding STBs 230/televisions 240 and LTE services to local router 260/user devices 270.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
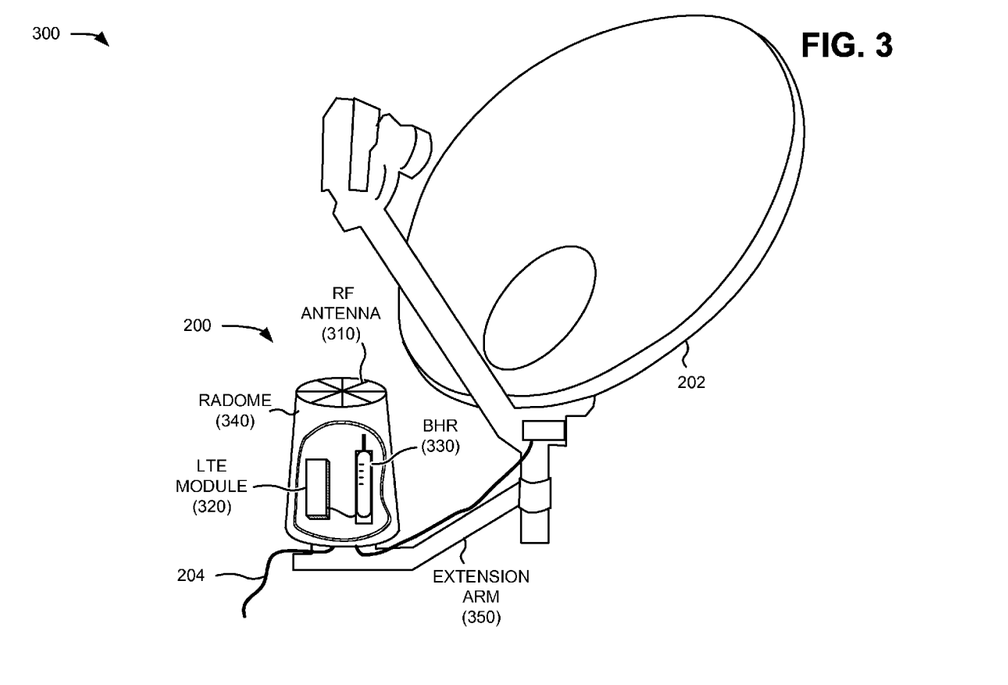
FIG. 3 is a diagram of example components of an outdoor portion of the customer premises network depicted in FIG. 2.

FIG. 3 is a diagram of example components of an outdoor portion 300 of customer premises network 110. As illustrated, portion 300 may include outdoor broadband unit 200 and satellite antenna 202. Outdoor broadband unit 200 may include a radio frequency (RF) antenna 310, an LTE module 320, and a broadband home router (BHR) 330 all housed in a radome 340. Satellite antenna 202 my include features described above in connection with, for example, FIGS. 1 and 2. In one implementation, as shown in FIG. 3, outdoor broadband unit 200 may be mounted on an extension arm 350 connected to a pole supporting satellite antenna 202.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., base station 120) connected to a network (e.g., network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

In one implementation, RF antenna 310 may include a wideband multiple beam antenna, with partially overlapping antenna beams, spanning 360 degrees in azimuth (x-y plane). For example, antenna 310 may include between four and eight beams (e.g., to achieve desirable antenna gains and reduction of interference). Additionally, or alternatively, RF antenna 310 may employ two polarizations per beam for 2×2 downlink multiple-input and multiple-output (MIMO) operation.

In another implementation, RF antenna 310 may include a fixed dually-polarized directional antenna. As a directional antenna, RF antenna 310 may use polarizations matched to the polarizations of a particular base station (e.g., base station 120). For example, polarization of RF antenna 310 may be matched in polarization with a serving enhanced Node B (eNB) or base station (e.g., base station 120). Antenna pointing for the directional antenna may be conducted, for example, during installation of outdoor broadband unit 200.

LTE module 320 may include hardware or a combination of hardware and software having communication capability via an air interface. For example, LTE module 320 may receive broadband signals and/or VoIP signals from base station 120 (e.g., via RF antenna 310) and transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 320 may select any of the RF antenna 310 beams, based on real-time measurements, during normal operation.

BHR 330 may include a device for buffering and forwarding data packets toward destinations. For example, BHR 330 may receive data packets from base station 120 (e.g., via LTE module 320) and forward the data packets toward user devices 270. In addition, BHR 330 may receive data packets from user devices 270 (e.g., via local router 260) and forward the data packets toward recipient devices (e.g., service provider 140) via network 130. BHR 330 may include a bridge device to receive signals from LTE module 320 via a wired USB connection and convert the signals to an Ethernet over coax signal. The Ethernet over coax signal may be assigned a logical channel (e.g., according to SWiM guidelines) and may be combined with coaxial input from satellite antenna 202. In one implementation, the output from BHR 330 may be inserted in a Mid-RF MoCA channel that is separate from the 950 MHz to 2150 MHz range of a typical satellite TV system. BHR 330 may combine coaxial input from satellite antenna 202 with output from BHR 330 within the Mid-RF MoCA channel and/or other logical channels. In implementations described herein, "Mid-RF" may correspond to 425-650 MHz.

Radome 340 (shown with cut-away view to reveal LTE module 320 and BHR 330) may provide a weatherproof enclosure to protect RF antenna 310, LTE module 320, BHR 330 and/or other components of outdoor broadband unit 200. Generally, radome 340 may include any RF transparent structure that protects components in an outdoor environment.

Outdoor broadband unit 200 may be integrated with the SWiM environment associated with satellite antenna 202 to provide both TV services and broadband wireless service. With this architecture, outdoor broadband unit 200 may follow a Mid-RF channelization plan, requiring only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of network portion 300, in other implementations, network portion 300 may contain fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
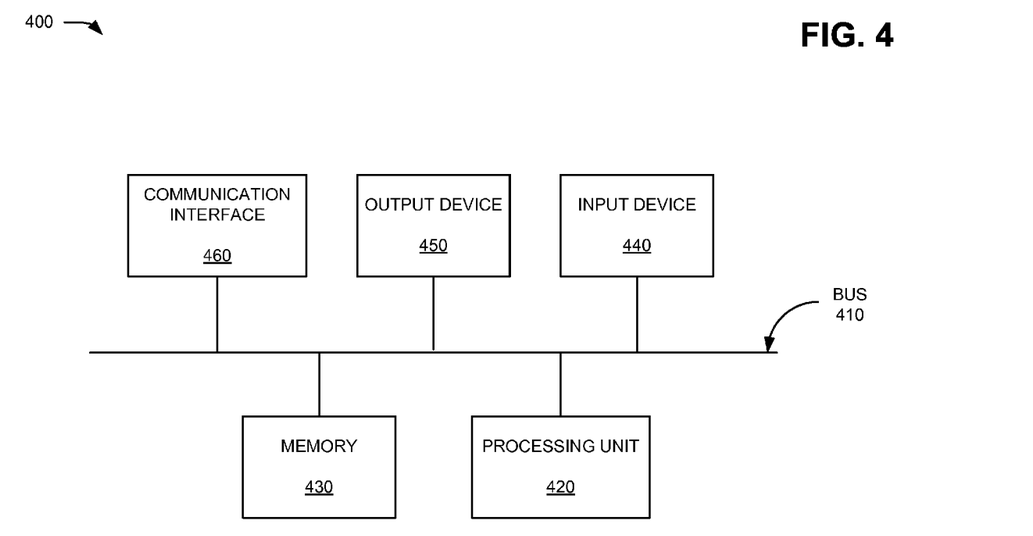
FIG. 4 is a diagram of example components of one of the devices depicted in FIGS. 1-3.

FIG. 4 is a diagram of example components of a device 400 that may correspond to one of the devices of environment 100 and/or customer premises network 110. One or more of the devices depicted in FIGS. 5 and 7 (and described below) may contain comparable configurations. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 110.

As described herein, device 400 may perform certain operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
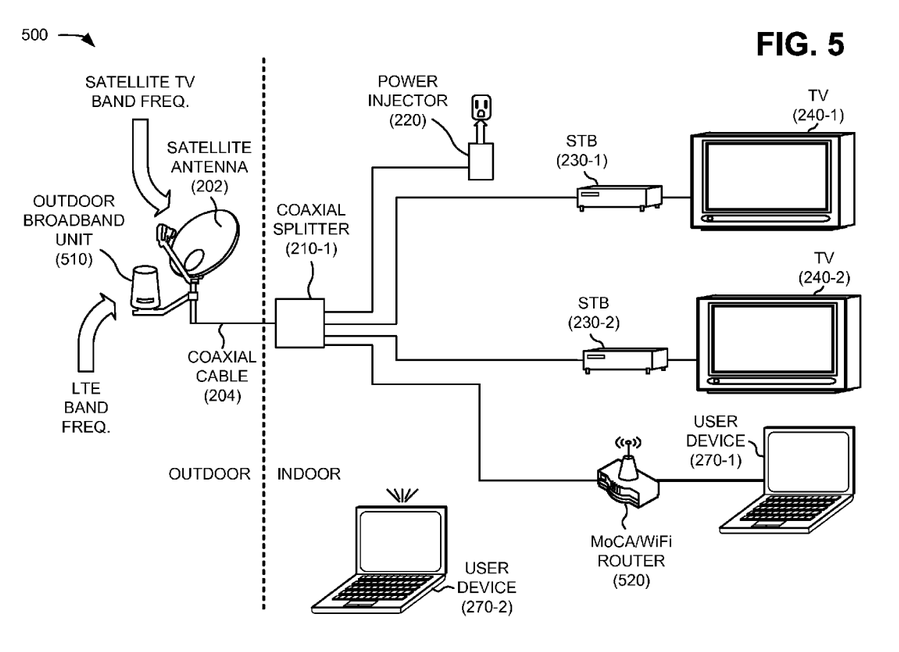
FIG. 5 is a diagram of another customer premises network according to an implementation described herein.

FIG. 5 is a diagram of an example customer premises network 500 according to another implementation described herein. Generally, customer premises network 500 moves MoCA routing functions to the indoor portion of the customer premises, in contrast with the arrangement of customer premises network 110 described above.

Referring to FIG. 5, customer premises network 500 may include an outdoor broadband unit 510, a MoCA/WiFi router 520, satellite antenna 202, coaxial cable 204, coaxial splitter 210-1, power injector 220, STBs 230-1 and 230-2, televisions 240-1 and 240-2, and user devices 270-1 and 270-2. One outdoor broadband unit 510, one MoCA/WiFi router 520, one satellite antenna 202, one coaxial cable 204, one coaxial splitter 210-1, one power injector 220, two STBs 230, two televisions 240, and two user devices 270 have been illustrated in FIG. 5 for simplicity. In practice, there may be more (or fewer) outdoor broadband units 510, MoCA/WiFi routers 520, satellite antennas 202, coaxial cables 204, coaxial splitters 210, power injectors 220, STBs 230, televisions 240, and/or user devices 270. Satellite antenna 202, coaxial cable 204, coaxial splitter 210-1, power injector 220, STBs 230, televisions 240, and/or user devices 270 may include the features described above in connection with, for example, FIGS. 1-4.

Outdoor broadband unit 510 may include one or more devices to send/receive LTE signals and to merge received LTE signals with satellite TV signals. In one example, outdoor broadband unit 510 may include a wireless gateway that provides a convergence point between wireless protocols (e.g., associated with base station 120) and IP protocols (e.g., associated with user devices 270). Outdoor broadband unit 510 may be physically deployed with satellite antenna 202 (e.g., on a roof or a side wall of a house associated with customer premises network 110). For example, outdoor broadband unit 510 may utilize a pre-existing or new satellite TV installation in a way that both broadband (over LTE) service and satellite TV are brought inside the customer premises over coaxial cable 204. Outdoor broadband unit 510 is discussed further in connection with, for example, FIG. 6.

MoCA/WiFi router 520 may include a device that provides connectivity between equipment within customer premises (e.g., user devices 270) and between the indoor customer premises equipment and outdoor broadband unit 510. MoCA/WiFi router 520 may receive the combined input from both outdoor broadband unit 510 and satellite antenna 202 that is brought inside the customer premises over coaxial cable 204. MoCA/WiFi router 520 may buffer and forward data packets toward destinations (e.g., particular user devices 270).

MoCA/WiFi router 520 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. MoCA/WiFi router 520 may also include one or more wired (e.g., Ethernet) connections. In one implementation, MoCA/WiFi router 520 may include a USB Ethernet router that is capable of meeting LTE quality of service (QoS) standards.

Figure 6:
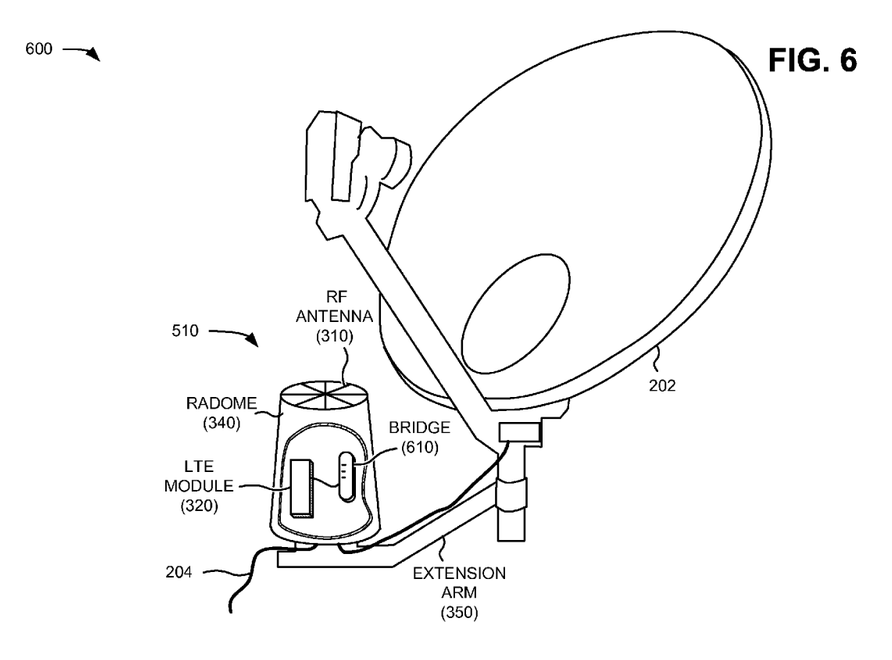
FIG. 6 is a diagram of example components of an outdoor portion of the customer premises network depicted in FIG. 5.

FIG. 6 provides a diagram of example components of an outdoor portion 600 of customer premises network 500. As illustrated, portion 600 may include outdoor broadband unit 510 and satellite antenna 202. Outdoor broadband unit 510 may include a bridge 610, RF antenna 310, and LTE module 320, all housed in radome 340. In one implementation, as shown in FIG. 6, outdoor broadband unit 510 may be mounted on extension arm 350 connected to a pole supporting satellite antenna 202. RF antenna 310, LTE module 320, and radome 340 may include the features described above in connection with, for example, FIG. 3.

Bridge 610 may include device to combine coaxial input from satellite antenna 202 with output from LTE module 320 into a single coax line (e.g., coaxial cable 204 using a Mid-RF MoCA channel). Bridge 610 may, for example, receive signals from LTE module 320 via a wired USB connection and convert the signals to an Ethernet over coax signal. The Ethernet over coax signal may be assigned a logical channel (e.g., according to SWiM guidelines) and may be combined with coaxial input, within the Mid-RF MoCA channel and/or on other logical channels, from satellite antenna 202. In an implementation, bridge 610 may include weather-proof construction and/or materials to limit effects of weather conditions that may not be overcome by use of radome 340 (e.g., hot/cold, moisture, etc.).

The arrangement of components of customer premises network 500, as shown in FIGS. 5 and 6, may reduce the overall power consumption and heat dissipation for outdoor broadband unit 510 (e.g., in contrast with the power consumption and heat dissipation of outdoor broadband unit 200). Also, the arrangement of components of customer premises network 500 may provide different power supply options for MoCA/WiFi router 520, since MoCA/WiFi router 520 would not be limited to receiving power via coaxial cable 204. Thus, the arrangement of components of customer premises network 500 may allow for a different level of sophistication/complexity for MoCA/WiFi router 520 (e.g., in contrast with the design of outdoor broadband unit 200), and may reduce the overall cost of equipment for customer premises network 500.

Although FIGS. 5 and 6 show example components of customer premises network 500, in other implementations, customer premises network 500 may contain fewer components, different components, differently arranged components, and/or additional components than those depicted in FIGS. 5 and 6. Alternatively, or additionally, one or more components of customer premises network 500 may perform one or more other tasks described as being performed by one or more other components of customer premises network 500.

Figure 7:
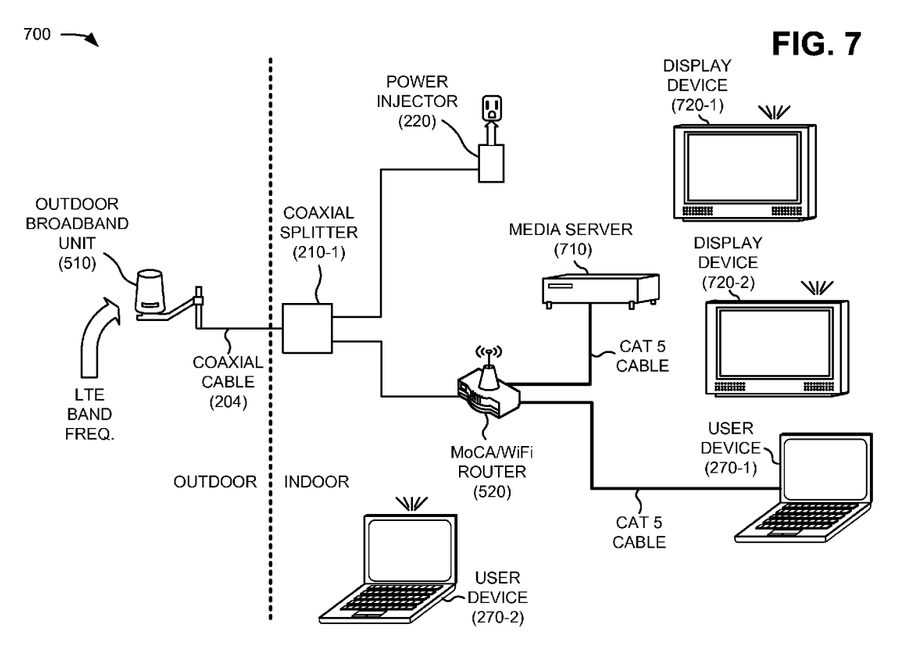
FIG. 7 is a diagram of still another customer premises network according to an implementation described herein.

FIG. 7 is a diagram of an example customer premises network 700 according to another implementation described herein. Generally, customer premises network 700 may be independent of any satellite signal, in contrast with the arrangement of customer premises networks 110 and 500 described above. Customer premises network 700 may be used to provide, for example, broadband, video, and VoIP services using LTE.

Referring to FIG. 7, customer premises network 700 may include a media server 710, display devices 720-1 and 720-2 (referred to herein collectively as "display devices 720" or generically as "display device 720"), coaxial cable 204, coaxial splitter 210-1, power injector 220, user devices 270-1 and 270-2, outdoor broadband unit 510, and MoCA/WiFi router 520. One media server 710, two display devices 720, one coaxial cable 204, one coaxial splitter 210-1, one power injector 220, two user devices 270, one outdoor broadband unit 510, and one MoCA/WiFi router 520 have been illustrated in FIG. 7 for simplicity. In practice, there may be more (or fewer) media servers 710, display devices 720, coaxial cables 204, coaxial splitters 210, power injectors 220, user devices 270, outdoor broadband units 510, and/or MoCA/WiFi routers 520. Coaxial cable 204, coaxial splitters 210, power injectors 220, user devices 270, outdoor broadband unit 510, and/or MoCA/WiFi router 520 may include the features described above in connection with one or more of, for example, FIGS. 1-6.

Media server 710 may include one or more server entities, or other types of computation or communication devices, that gather, process, search, and/or provide information in a manner described herein. In one implementation, media server 710 may include a device (e.g., a computer system and/or an application-specific circuit) capable of processing, storing, and/or generating media streams. In one implementation, media server 710 may receive multimedia content from network 130 (e.g., via outdoor broadband unit 510 and MoCA/WiFi router 520) and send the multimedia content to one or more display devices 720 and/or user devices (e.g., via MoCA/WiFi router 520).

Display device 720 may include a display via which a user may view multimedia content (including, for example, video-on-demand, IPTV, and/or interactive television applications). Display device 720 may refer to any device that can receive and display multimedia content delivered over network 130 and/or through media server 710 for perception by users. Display device 720 may include technologies, such as liquid crystal displays (LCDs), light-emitting diode (LED) displays, plasma displays, cathode ray tube (CRT) displays, etc. In one implementation, display device 720 may include a wireless communication device that is capable of communicating with media server 710 via MoCA/WiFi router 520.

In customer premises network 700, outdoor broadband unit 510 may receive LTE signals that are provided to other devices within customer premises network 700. As described above with respect to FIG. 6, outdoor broadband unit 510 may include bridge 610 (as well as RF antenna 310, LTE module 320, and radome 340). Bridge 610 may, for example, receive signals from LTE module 320 via a wired USB connection and convert the signals to an Ethernet over coax signal. The Ethernet over coax signal may be assigned a logical channel (e.g., according to SWiM guidelines). In contrast with the configuration of customer premises network 500, in customer premises network 700, outdoor broadband unit 510 may not be connected to a satellite antenna. Thus, signals from bridge 610 (e.g., sent over coaxial cable 240) may only include signals from LTE module 320 and the entire frequency range of the MidRF MoCA channel (e.g., 425-650 MHz) may be available for LTE signals.

The arrangement of components of customer premises network 700 may reduce the overall power consumption and heat dissipation for outdoor broadband unit 510 (e.g., in contrast with the power consumption and heat dissipation of outdoor broadband unit 200). Also, the arrangement of components of customer premises network 700 may provide different power supply options for MoCA/WiFi router 520, since MoCA/WiFi router 520 would not be limited to receiving power via coaxial cable 204. Thus, the arrangement of components of customer premises network 700 may allow for a different level of sophistication/complexity for MoCA/WiFi router 520 (e.g., in contrast with the design of outdoor broadband unit 200), and may reduce the overall cost of equipment for customer premises network 700.

Although FIG. 7 shows example components of customer premises network 700, in other implementations, customer premises network 700 may contain fewer components, different components, differently arranged components, and/or additional components than those depicted in FIG. 7. Alternatively, or additionally, one or more components of customer premises network 700 may perform one or more other tasks described as being performed by one or more other components of customer premises network 700.

Figure 8:
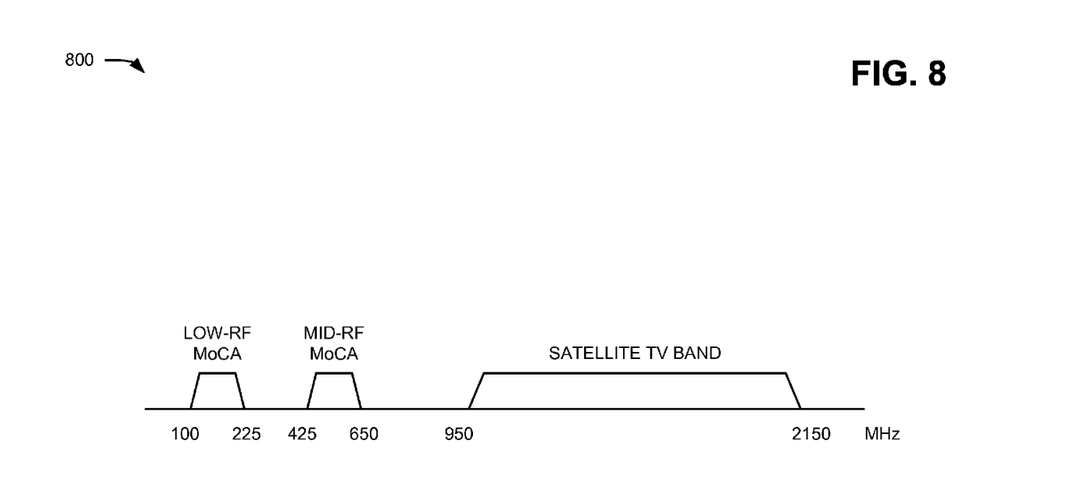
FIG. 8 is a diagram of a switch frequency plan for a single coaxial cable that may provide broadband service and satellite TV service.

FIG. 8 provides a diagram of a switch frequency plan 800 for a single coaxial cable (e.g., coaxial cable 204) providing broadband service and satellite TV service. As shown in FIG. 8, a Mid-RF MoCA network channel may have a frequency range of 425-650 MHz that can coexist with a 950 MHz to 2150 MHz range of a typical satellite TV system. As described above in connection with, for example, FIGS. 2-6, a Mid-RF MoCA network channel may include LTE signals from/to outdoor broadband unit 200 (in customer premises network 110) or outdoor broadband unit 510 (in customer premises network 500). LTE signals inserted in the Mid-RF MoCA network channel may share bandwidth (e.g., within the frequency range of 425-650 MHz) with LAN communications for satellite TV services. Thus, LTE data may be practically transmitted at speeds of about 50 Mbps over the shared Mid-RF MoCA network channel.

In another implementation, another channel, such as a Low-RF MoCA channel, may be provided. As show in FIG. 8, the Low-RF channel may have a frequency range of about 100-225 MHz that can coexist with both the Mid-RF MoCA channel and the satellite TV band. With this architecture, the combination of outdoor broadband unit 200 (in customer premises network 110) or outdoor broadband unit 510 (in customer premises network 500) and satellite antenna 202 may follow a channelization plan that includes both Low-RF and Mid-RF, requiring only one coax line 204 in the deployment. The dual MoCA channels (e.g., the Low-RF and Mid-RF channels) may provide higher available bandwidth for LTE data services. For example, the Low-RF channel may be reserved for LTE signals, while the Mid-RF channel may be reserved for LAN communications for satellite TV services. The dedicated a Low-RF channel may provide an LTE data rate of up to 110 Mbps, in contrast with a typical LTE data rate of 50 Mbps when LTE and satellite TV share a MoCA channel.

Figure 9:
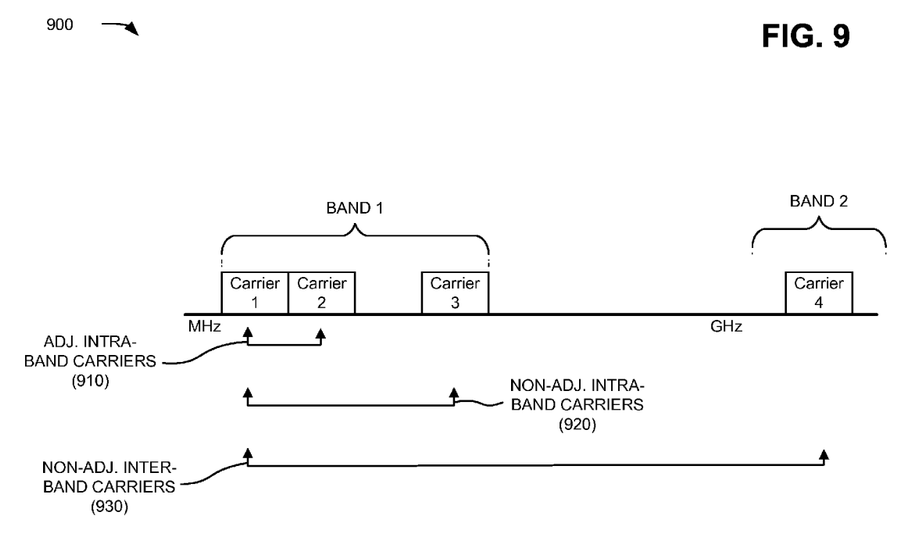
FIG. 9 is a diagram of an example LTE carrier frequency plan for multiple LTE carriers.

FIG. 9 provides a diagram of an example LTE carrier frequency plan 900 for multiple LTE carriers. While some service providers may currently have a single carrier frequency block (e.g., "Carrier 1," "Carrier 2," Carrier 3," or "Carrier 4") designated for LTE services, other service providers may have multiple carrier frequency blocks. The multiple carrier frequency blocks may be adjacent (e.g., "Carrier 1" and "Carrier 2"), as indicated by reference number 910; non-adjacent within the same frequency band (e.g., "Carrier 1" and "Carrier 3"), as indicated by reference number 920; or non-adjacent in different frequency bands (e.g., "Carrier 1" and "Carrier 4"), as indicated by reference number 930.

Service providers using a single carrier frequency block (e.g., one of E-UTRA Operating Band nos. 13, 14, or 17) may typically have 10 MHz available for downlinks and 10 MHz available for uplinks to provide broadband services to a customer premises (e.g., customer premises network 110, customer premises network 500, customer premises network 700, etc.). LTE carrier aggregation may include use of multiple carrier frequency blocks to provide LTE services. In one implementation, outdoor broadband unit 200 may simultaneously transmit and receive data in different LTE carriers (e.g., "Carrier 1," "Carrier 2," etc.). For example, using the dual MoCA channels (e.g., the Low-RF and Mid-RF channels) described above in FIG. 8, outdoor broadband unit 510 (e.g., in customer premises network 700) may provide dedicated MoCA channels for each carrier. For example, the Low-RF channel may be reserved for LTE signals from "Carrier 1," while the Mid-RF channel may be reserved for LTE signals from "Carrier 2."

In one implementation, outdoor broadband unit 510 may include two RF antennas 310 to receive LTE signals over multiple carriers. For example, in the case of non-adjacent inter-band carriers 930, one RF antenna 310 may be included for "Carrier 1" (e.g., for a 700 MHz frequency band) and another RF antenna 310 may be included for "Carrier 4" (e.g., for a 1.7/2.1 GHz frequency band). In other implementations, a single RF antenna 310 may be modified with additional degrees of freedom to facilitate LTE signals over multiple carrier frequencies.

Although FIG. 9 shows an example LTE carrier frequency plan 900 for multiple LTE carriers that may be used with outdoor broadband unit 510, in other implementations, different combinations of carrier frequencies may be used.

While OFDM techniques have been described above to support provision of broadband (over LTE) service and satellite TV service to a customer premises network over a single coaxial line, time division duplex (TDD) techniques may also be used where the same block of frequencies are used to support both downlink and uplink services. TDD techniques may be used, for example, in customer premises network 110, customer premises network 500, and/or customer premises network 700.

In implementations described herein, application of TDD may permit RF antenna 310 (FIG. 3) to be implemented as a narrowband multiple beam antenna instead of wideband antenna. For example, RF antenna 310 may include a narrowband multiple beam antenna, with partially overlapping antenna beams, spanning 360 degrees in azimuth. As a narrowband antenna, RF antenna 310 may provide, for example, higher antenna gain (as compared to a wideband antenna), a flat response over the narrowband, a higher antenna polarization isolation (as compared to a wideband antenna), and better (higher) front-to-back (F/B) ratio than a wideband antenna. Also, as a narrowband antenna, RF antenna 310 may have a smaller footprint than a wideband antenna due to the higher frequency bands (e.g., above 2 GHz) typically used for TDD. Furthermore, beam selection circuitry for LTE module 320, responsible for selecting the best possible beam for RF antenna 310 in downlink and uplink transmissions, may be simplified, since the same beam is used for both downlink and uplink. The beam selection mechanism of LTE module 320 may also include additional constraints when implementing TDD. For example, since downlink and uplink transmissions split time resources, channel measurements conducted by LTE module 320 may have to be conducted during a duty cycle allocated for downlink transmissions.

Each of customer premises network 110, customer premises network 500, and/or customer premises network 700 may use a single LTE uplink transmitter and dual LTE downlink receivers included, for example, in LTE module 320. In another implementation, LTE module 320 may include multiple transmitters and multiple receivers. For example, to enhance the spectral efficiency of the uplink and downlink and thereby improve the end user data rates, N×N uplink and downlink MIMO may be employed. Transmitting and receiving multiple streams by LTE module 320 using the same LTE air interface resources. However, the multiple beam configuration of RF antenna 310 may be modified to accommodate multiple transmitters and receivers per beam. RF antenna 310 may employ multiple antennas per beam, which are realized using a combination of spatial and polarization diverse antennas.

In implementations described herein, each of customer premises network 110, customer premises network 500, and/or customer premises network 700 may perform beam selection based on downlink signal quality, and the same antenna beam is used for the uplink as well. However, there may be situations where an optimal beam for the downlink would yield a sub-optimal performance for the uplink. In another implementation, LTE module 320 may include separate RF switching circuitry for the uplink transmission. LTE module 320 may select the optimal beam for the uplink transmission based on, for example, transmit power and uplink throughput measurements. LTE module 320 may also make sure that both the downlink and uplink beams point to the same LTE cell (e.g., base station 120).

Figure 10:
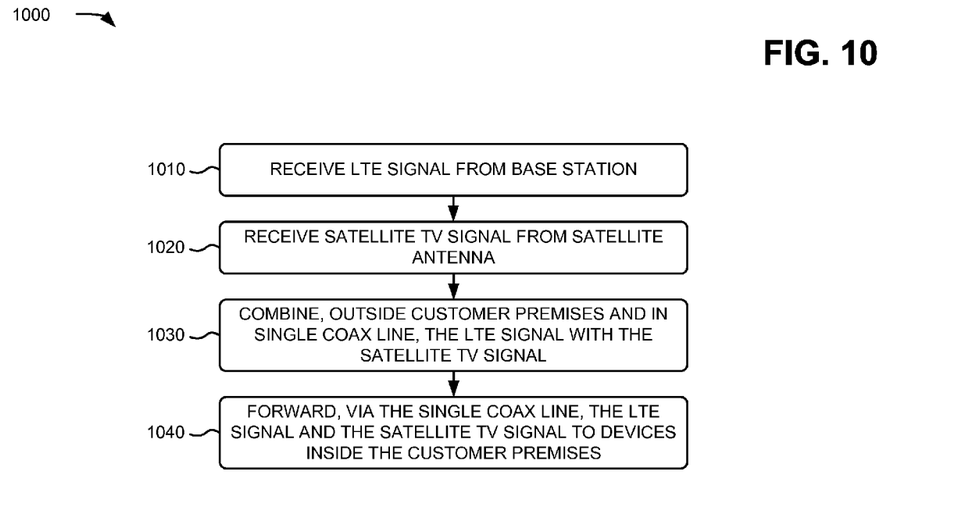
FIG. 10 is a flow chart of an example process for combining LTE functionality with satellite TV service according to implementations described herein.

FIG. 10 is a flow chart of an example process 1000 for combining LTE functionality with satellite TV service according to implementations described herein. In one implementation, process 1000 may be performed by outdoor broadband unit 200. In another implementation, some or all of process 1000 may be performed by another device or group of devices, including or excluding outdoor broadband unit 200.

As illustrated in FIG. 10, process 1000 may include receiving an LTE signal from a base station (block 1010). For example, in implementations described above in connection with FIG. 3, LTE module 320 of outdoor broadband unit 320 may receive broadband signals and/or VoIP signals from base station 120 (e.g., via RF antenna 310) and transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 320 may select any of the RF antenna 310 beams, based on real-time measurements, during normal operation.

Returning to FIG. 10, process 1000 may include receiving a satellite TV signal from a satellite antenna (block 1020), and combining, outside the customer premises and in a single coaxial line, the LTE signal and the satellite TV signal (block 1030). For example, in implementations described above in connection with FIG. 3, BHR 330 of outdoor broadband unit 320 may include a bridge device to receive signals from LTE module 320 via a wired USB connection and convert the signals to an Ethernet over coax signal. The Ethernet over coax signal may be assigned a logical channel (e.g., according to SWiM guidelines) and may be combined with coaxial input from satellite antenna 202. In one implementation, the output from BHR 330 may be inserted in a MidRF MoCA channel that is separate from the 950 MHz to 2150 MHz range of a typical satellite TV system. BHR 330 may combine coaxial input from satellite antenna 202 with output from BHR 330 within the MidRF MoCA channel and/or other logical channels.

Returning to FIG. 10, process 1000 may include forwarding, via the single coax line, the LTE signal and the satellite TV signal to devices inside the customer premises (block 1040). For example, in implementations described above in connection with FIG. 3, outdoor broadband unit 200 may follow a MidRF channelization plan, requiring only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2).

Systems and/or methods described herein may provide a customer premises equipment (CPE) wireless architecture with simplified initial installation and reduced operational costs. The systems and/or methods may receive, at a location outside a customer premises, a broadband signal from a base station of a wireless network and a satellite television signal from a satellite antenna. The systems and/or methods may combine, at the location outside the customer premises, the broadband signal with the satellite television signal in a single coaxial cable and send, via the single coaxial cable, the broadband signal and the satellite television signal to one or more devices inside the customer premises.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
an outdoor broadband unit located outside a customer premises to:
receive, at a first frequency, a broadband signal from a wireless network base station,
convert, while outside the customer premises, the broadband signal from the first frequency to a second frequency, where the second frequency is different from the first frequency,
apply the converted signal to a single coaxial cable, and
forward, using the single coaxial cable, the converted signal to one or more devices inside the customer premises,
wherein the outdoor broadband unit includes:
a long term evolution (LTE) module to:
receive the broadband signal from the base station, and
forward the broadband signal via a wired connection; and
a bridge to:
receive the broadband signal from the LTE module, and
convert the broadband signal to an Ethernet over coax signal.

2. The system of claim 1, further comprising:
a satellite antenna to:
receive a satellite television signal, and
forward, to the outdoor broadband unit, the satellite television signal via a different coaxial cable,
where the outdoor broadband unit combines the broadband signal with the satellite television signal in the single coaxial cable.

3. The system of claim 1, where the outdoor broadband unit receives power only from the coaxial cable.

4. The system of claim 1, where the outdoor broadband unit further includes:
a Multimedia Over Coax Alliance (MoCA)-compliant router.

5. The system of claim 1, where the wired connection includes a universal serial bus (USB) cable, and where the LTE module is powered from the USB cable.

6. The system of claim 1, where the outdoor broadband unit further includes:
a radio frequency (RF) antenna, and
a radome that houses the LTE module, the bridge, and the RF antenna.

7. The system of claim 1, where the outdoor broadband unit further includes:
a wideband multiple beam antenna, or
a directional antenna using polarizations matched to the polarizations of the base station.

8. The system of claim 1, further comprising:
a Multimedia Over Coax Alliance (MoCA)-compliant router inside the customer premises.

9. The system of claim 1, where the broadband signal is one of:
a Long Term Evolution (LTE) signal,
a Global System for Mobile Communications (GSM) signal,
a wideband code division multiple access (WCDMA) signal,
a Ultra Mobile Broadband (UMB) signal,
a Universal Mobile Telecommunications System (UMTS) signal,
a Code Division Multiple Access 2000 (CDMA2000) signal,
a High-Speed Packet Access (HSPA) signal, or a Worldwide Interoperability for Microwave Access (WiMax) signal.

10. A method implemented by one or more network devices, the method comprising:
receiving, by one of the one or more network devices located outside a customer premises, a broadband signal from a base station of a wireless network;
receiving, by the one of the or more network devices located outside the customer premises, a satellite television signal from a satellite antenna;
combining, outside the customer premises and in a single coaxial cable, the broadband signal with the satellite television signal; and
sending, via the single coaxial cable, the broadband signal and the satellite television signal to one or more devices inside the customer premises, wherein the broadband signal is included in a first Multimedia Over Coax Alliance (MoCA)-compliant channel and the satellite television signal is included in a second MoCA-compliant channel.

11. The method of claim 10, where the satellite television signal is sent from the satellite antenna to the one of the one or more network devices via a different coaxial cable.

12. The method of claim 10, where the broadband signal is a Long-Term Evolution (LTE) signal.

13. The method of claim 10, where the one or more network devices are mounted on an extension arm attached to the satellite antenna.

14. The method of claim 10, where the first MoCA-compliant channel and the second MoCA-compliant channel are included within a frequency range of 425 MHz to 650 MHz.

15. A method implemented by one or more network devices, the method comprising:
receiving, by one of the one or more network devices located outside a customer premises, a broadband signal from a base station of a wireless network;
receiving, by the one of the or more network devices located outside the customer premises, a satellite television signal from a satellite antenna;
combining, outside the customer premises and in a single coaxial cable, the broadband signal with the satellite television signal;
sending, via the single coaxial cable, the broadband signal and the satellite television signal to one or more devices inside the customer premises;
receiving, by one of the one or more network devices located outside a customer premises, another broadband signal from a base station of the wireless network, where the other broadband signal uses a different carrier frequency than the broadband signal; and
combining, outside the customer premises and in the single coaxial cable, the other broadband signal with the broadband signal and the satellite television signal.

16. The method of claim 10, where receiving a broadband signal from a base station of a wireless network comprises:
selecting, based on one or more link quality measurements, an optimal beam from a multi-beam antenna.

17. The method of claim 10, where the broadband signal from the base station is a downlink signal received using a first beam of a multiple beam antenna, and where the method further comprises:
sending, to the base station, an uplink signal using a second beam of the multiple beam antenna.

18. A device, comprising:
- means for receiving, at a location outside a customer premises, a broadband signal from a base station of a wireless network;
- means for receiving, at a location outside the customer premises, a satellite television signal from a satellite antenna;
- means for combining, at the location outside the customer premises, the broadband signal with the satellite television signal in a single coaxial cable;
- means for sending, via the single coaxial cable, the broadband signal and the satellite television signal to one or more devices inside the customer premises;
- means for receiving, at the location outside the customer premises, another broadband signal from a base station of the wireless network, where the other broadband signal uses a different carrier frequency than the broadband signal, and
- means for combining, at the location outside the customer premises and in the single coaxial cable, the other broadband signal with the broadband signal and the satellite television signal.

* * * * *